Patented Feb. 17, 1953

2,628,957

UNITED STATES PATENT OFFICE 2,628,957

METHOD OF PRODUCING VINYL CHLORIDE-STYRENE COPOLYMERS

Harold Tucker, Akron, Ohio, assignor to The B. F. Goodrich Company, New York, N. Y., a corporation of New York No Drawing. Application March 31, 1949, Serial No. 84,751

2 Claims. (Cl. 260—87.5)

1

This invention relates to copolymers of vinyl chloride and styrene and to a method for their production and pertains particularly to true copolymers containing 30 to 99% by weight of copolymerized vinyl chloride and 1 to 70% by weight of copolymerized styrene, which copolymers are substantially free from polystyrene and are possessed of unusual properties including the ability to be dissolved completely by inexpensive solvents such as acetone ethyl acetate and benzene, the ability to be processed without plasticizing aids and to be mixed with plasticizers at temperatures considerably below those necessary with commercial vinyl chloride resins and the ability to be used in the production of films and coatings of high clarity and excellent stability to heat and light.

It has heretofore been suggested that monomeric mixtures of vinyl chloride and styrene be polymerized in aqueous emulsion in the manner customarily employed in producing copolymers of vinyl chloride with such monomeric materials as vinylidene chloride and alkyl acrylates, that is, by emulsifying the monomer mixture in an aqueous medium with the aid of an emulsifying agent, adding a polymerization catalyst such as a peroxygen compound and heating and agitating the emulsion until polymerization takes place. When so proceeding, however, the resulting polymeric products contain appreciable proportions of polystyrene (because of the tendency for styrene molecules to combine with themselves in preference to combining with vinyl chloride molecules) and also some polyvinyl chloride (because the styrene content of the monomeric mixture becomes exhausted due to the preferential formation of polystyrene), so intimately combined with any true copolymer of vinyl chloride and styrene formed that separation by practical procedure is virtually impossible. Consequently, such polymeric materials are insoluble in all solvents which fail to dissolve either or both polyvinyl chloride and polystyrene; they are tough and non-plastic, difficult to mix with plasticizers and incapable, even when plasticized, of being used to produce clear homogeneous films and coatings of good strength. Because of possessing these disadvantages, as well as possessing the other disadvantages of both polyvinyl chloride and polystyrene, products resulting from the emulsion polymerization of mixtures of vinyl chloride with styrene have been avoided by the art, even though styrene is one of the most inexpensive monomeric materials.

There is another reason why it has been disadvantageous to copolymerize styrene with vinyl chloride. This is the fact that the presence of even small quantities of styrene ordinarily greatly inhibits the polymerization of vinyl chloride in aqueous emulsion. For example, heating and agitation at 50° C. of an aqueous polymerization medium comprising 250 parts of water, 100 parts of vinyl chloride, 2 parts of sodium lauryl sulfate as an emulsifier, and one part of potassium persulfate as a catalyst, results in a yield of 80% or more of polyvinyl chloride in 3 to 4 hours, but when as little as 3% of styrene is added to such a medium the yield of polymer in 4 hours is barely discernible being of the order of 2% or less. Similar results are obtained with greater amounts of styrene, the yield in 4 hours at 50° C. when 10% styrene is added is still less than 10%. Therefore, it has been considered impractical to attempt to add monomeric styrene continuously to a vinyl chloride emulsion in the hope that this technique would lead to the formation of a true vinyl chloride styrene copolymer.

This invention provides a solution to the problem of producing a true vinyl chloride styrene copolymer free from interfering amounts of polyvinyl chloride and polystyrene. The solution arises from the unexpected discovery that the presence of monomeric styrene does not inhibit the emulsion polymerization of vinyl chloride when the concentration of monomeric styrene and monomeric vinyl chloride are carefully controlled throughout the polymerization reaction and when the polymerization is conducted in presence of a particular "redox" catalyst, that is, a combination of a particular oxidizing agent with a particular reducing agent. Both of these factors are critical in the method of this invention. The proportions of monomeric styrene and monomeric vinyl chloride in the monomeric mixture must be maintained at all times during the polymerization reaction within the range of from 9 to 99 parts by weight of vinyl chloride to one part of styrene (90 to 99% vinyl chloride and 1 to 10% styrene) in order to insure a reaction involving smooth entry of styrene molecules into combination with vinyl chloride molecules. When the proportion of styrene in the monomeric mixture is raised above these limits the amount of vinyl chloride in the copolymer falls off very rapidly and the tendency for polystyrene formation is greatly increased. The catalyst used is a combination of a water-soluble persulfate such as potassium, sodium and ammonium persulfate and a water-soluble sulfite such as sodium, potassium or ammonium sulfite. The proportion of catalyst will vary somewhat, generally increasing with increase in the styrene content of the monomeric mixture. For example, as little as 0.175% by weight each of potassium persulfate and sodium sulfite based on the monomers to as much as 2.0 to 5% or more each may be used to produce rapid reactions to high yields.

When these conditions are maintained the polymeric products of this invention consisting of true copolymers of vinyl chloride and styrene containing 30 to 99% by weight of copolymerized vinyl chloride and 1 to 70% by weight of copolymerized styrene are secured without difficulty and in a very short reaction time.

It has also been found that the copolymers of this invention possess a number of unexpected properties, perhaps the most important being their complete solubility in cheap solvents in which either or neither polystyrene and polyvinyl chloride are appreciably soluble, such solvents being, for example, acetone, ethyl acetate, benzene, and methyl ethyl ketone. Neither polystyrene nor polyvinyl chloride are soluble to any extent in acetone and ethyl acetate. The copolymers of this invention, however, are completely soluble in acetone and ethyl acetate, and are appreciably soluble in benzene and toluene. The solubility in acetone and ethyl acetate is unexpected since the copolymers of vinyl chloride and styrene do not contain ester linkages to aid the solubility as do many of the polymeric materials known to be soluble in these materials. These solubility characteristics make the copolymers of this invention widely applicable in economical coating and impregnating of a wide variety of materials and to various methods of film casting.

The copolymers of this invention have still other unexpected properties including high strength and elasticity, clarity, and especially stability to light, heat and corrosive materials. Among all the polymers of vinyl chloride, good grades of polyvinyl chloride itself have been found to be the most stable and to combine to the highest degree the properties of high strength and resistance to deterioration by light, heat, chemicals and electric potentials. The usual copolymers of vinyl chloride with vinyl acetate, the alkyl acrylates, vinylidene chloride and the like do not possess these properties to as great a degree as polyvinyl chloride but are usually superior to the latter in some other property such as solubility, adhesiveness, etc. The copolymers of this invention, however, are unique in that they have high strength and solubility and in addition, are fully the equal of or superior to polyvinyl chloride with respect to strength and elasticity and stability to heat, light and corrosion. For example, the copolymers of this invention upon exposure to heat and/or light color somewhat more rapidly than the best polyvinyl chloride compositions but the discoloration is largely a surface effect. Continued drastic exposure to heat and/or light reveals a definite superiority of my new copolymer over polyvinyl chloride. Polyvinyl chloride progressively discolors and deteriorates during the exposure showing a brownish white haze throughout the cross section and loss of considerable strength and elasticity while the vinyl chloride styrene copolymers of this invention suffer little more than a slight increase in the color tone of the surface discoloration.

The copolymers of this invention containing from 30 to 99% combined vinyl chloride and from 1 to 70% combined styrene vary in their precise characteristics depending on the combined styrene content. While all the copolymers within the above range are completely soluble in acetone and ethyl acetate to form clear solutions, the amount of copolymer which can be dissolved in a given amount of solvent increases as the combined styrene content of the copolymer increases in the range of 1 to 40%, and then falls off. The solubility of the copolymers in benzene, toluene and the like, likewise increases with increased combined styrene content.

The physical properties of hardness, softness, tensile strength, elongation, etc. of the copolymers of this invention vary also with the styrene content of the copolymer. For example, copolymers of vinyl chloride and styrene containing from 1 to 40% copolymerized styrene are, when suitably plasticized, much like plasticized polyvinyl chloride. That is, they are soft, flexible, and have high tensile strength and good elasticity. Copolymers of vinyl chloride and styrene containing from 40 to 70% copolymerized styrene become less flexible with increasing combined styrene content. It is preferred, therefore, to produce copolymers of vinyl chloride and styrene by the method of this invention which contain from 60 to 99% by weight of copolymerized vinyl chloride and from 1 to 40% copolymerized styrene. The copolymers of vinyl chloride and styrene containing from 1 to 25% copolymerized styrene are, however, especially preferred since they are possessed of all the good properties of polyvinyl chloride, are easier to process, have very good stability as compared to polyvinyl chloride itself, and in addition have the advantage of being soluble in inexpensive and readily available solvents in which polyvinyl chloride or polystyrene are highly insoluble.

In the method of this invention for preparing true copolymers of vinyl chloride and styrene without the concomitant formation of interfering amounts of polystyrene or polyvinyl chloride, the styrene content of the monomeric mixture is critical and determinative of the instantaneous styrene content of the polymer formed. For example, when the styrene content of a vinyl chloride polymerization medium is carefully maintained at or about 1% of the total monomers, the copolymer being formed will contain from 5 to 6% combined styrene. When the styrene content is increased to 2.5% the copolymer formed will contain about 10% combined styrene. Similarly, a monomeric mixture containing 3.75% styrene will produce a copolymer of about 20% styrene content, a mixture containing 5% styrene will produce a copolymer of 50% styrene, and a mixture containing 10% styrene will produce a copolymer of approximately 70% combined styrene. At all these concentrations the styrene content of the mixture must be precisely controlled throughout the reaction cycle lest a product be formed consisting of a mixture of copolymers of widely varying styrene content.

The styrene content of the reaction mixture is best controlled by adding styrene in a continuous manner so as to replace that being used up in the reaction. A constant displacement pump is the best instrument for effecting precise addition of the correct amount of styrene. The amount of styrene needed may be calculated from the reaction rate or it may be more precisely determined by measuring the heat of reaction and adding just enough styrene to replace that used as indicated by the quantity of heat liberated. Still another method, which however is not quite as sensitive to fluctuations in reaction rate or reaction temperature as the foregoing method due to time lag, is a method based upon total solids analysis performed on small samples removed from the reaction vessel at intervals during the reaction. The proportional addition need not be done in a continuous manner but may be made periodically if the additions are small and frequent. Should the styrene content become too high, immediate lowering of the styrene concentration may be effected by addition of the correct quantity of vinyl chloride as may be readily understood. However, the addition of monomers is effected, it must be understood that small variations in the relative proportions of styrene in the monomeric mixture have a profound effect on the composition of the instantaneous copolymer formed therefrom.

Other factors besides the aforementioned styrene composition of the monomeric mixture have important effects on the polymerization reaction and on the final copolymer produced. For example, the reaction between vinyl chloride and styrene in the presence of the "redox" catalyst is more rapid when the aqueous phase predominates in the reaction mixture. For the latter reason it is preferred to employ a reaction medium in which the water to monomer ratio is from 1:1 to 6:1 by weight.

The reaction between vinyl chloride and styrene is best conducted in an aqueous medium containing a small amount of an efficient emulsifying or dispersing agent. Emulsifying agents which may be used to include the fatty acid soaps; the synthetic saponaceous materials such as sodium lauryl sulfate (preferred) and other hymolal sulfates; the alkyl, aryl, and alkaryl sulfonates such as isopropyl naphthalene sodium sulfonate, decyl benzene sulfonate, the sodium petroleum sulfonates, the sodium salts of polymerized alkyl aryl sulfonic acids such as the sulfonated naphthalene aldehyde condensates; the sodium salt of n - octadecyl - N - 1,2 - dicarboxyethyl sulfosuccinamate, the dioctyl ester of sodium sulfosuccinic acid and others; rosin and dehydrogenated rosin acid soaps, and others. The amount of emulsifier does not appear critical as long as sufficient is used to accomplish emulsification. As little as 0.25% by weight of the emulsifier based on the aqueous phase has been found sufficient to produce a copolymer in the form of a latex. Amounts up to 1 to 5% or more may be used if desired.

The amount of redox catalyst in the aqueous emulsion during polymerization has a profound effect on reaction rate and on the properties of the copolymer produced. The amount of catalyst necessary will also increase as the styrene content of the reaction mixture is increased. For example, starting with a monomeric mixture containing 1% styrene to produce a copolymer of 5 to 6% combined styrene content, the use of 0.175% of each component of the catalyst caused the polymerization reaction to proceed to 40% yield and ¼% each by weight based on the total monomers of potassium persulfate and sodium sulfite causes a similar reaction mixture to proceed to a yield of 86% of copolymer in 6 hours at 50° C. When the proportion of styrene in the reaction medium is increased to 2½% (so as to produce a polymer containing about 10% combined styrene) the catalyst concentration has to be increased to 0.37% (of each component thereof) to obtain a yield of 70% in 12 hours. With still further increases in the styrene content amounts of catalyst as high as 1 to 2% or even 5% of each of the oxidant and reductant compounds may be necessary. It is to be understood that higher amounts may be used than those given above to produce more rapid reactions and vice versa. Since the higher amounts of catalyst react deleteriously on the properties of the copolymers, especially the electrical properties and the chemical stability, it is generally desirable to compromise and use the smallest amount of catalyst commensurate with reasonable reaction rates.

In the practice of this invention, it is also advantageous to prepare a polymerization medium containing a portion only of the oxidation-reduction (or "redox") catalyst and add the remainder of the catalyst at about the mid-point in the polymerization cycle. In this manner, less catalyst is required and more even reaction rates are obtained. A portion only of the reductant compound may be withheld and added when about 50% of the monomeric mixture has reacted with similarly advantageous results. Best results may be obtained by adding just enough catalyst at the start to initiate reaction and add the remainder over the entire reaction cycle.

The copolymerization of vinyl chloride and styrene may be effected at temperatures of from 0 to 100° C. or higher though generally reactions carried out at temperatures between 20 and 70° C. are most satisfactory and are therefore preferred. The reaction should preferably be carried out in an atmosphere low in atmospheric oxygen, for oxygen will interfere with the action of the "redox" catalyst. It is accordingly preferred to evacuate the reaction vessel and/or flush out the reaction vessel with an inert gas such as nitrogen before addition of the monomeric materials.

The invention will now be further described with reference to certain specific examples which demonstrate the preparation of vinyl chloride styrene copolymers of progressively increasing combined styrene content. These examples are intended to be merely illustrative of preferred techniques and not as limitations on the invention.

*Example 1*

An aqueous medium was prepared by dissolving 5 grams of sodium lauryl sulfate (known commercially as "Duponol M E Dry") in about 700 ml. of water and one gram of potassium persulfate in about 300 ml. The two portions were combined and about 1 gram of dry sodium sulfite added directly thereto. The aqueous medium was then added to a two quart stainless steel reaction vessel fitted with a stirrer and the vessel sealed, cooled with ice to 0° C., and evacuated to about 2 mm. Hg pressure. Vinyl chloride 396 grams and styrene 4 grams were then combined and added to the reaction vessel. The reaction vessel was then immersed in a constant temperature bath maintained at 45° C. In 15 minutes the vessel and its contents having reached 45° C., injection of styrene to the vessel was then started using a constant displacement pump delivering through stainless steel hypodermic tubing. Styrene was added at the rate of 3.2 grams per hour until a total of 20 grams were added.

Samples withdrawn from the reaction vessel by a hypodermic syringe technique showed 5% of the monomeric materials had reacted in one hour, 13% in two hours, 26.5% in 3 hours, 61% in 4 hours, and 86% in 6 hours. The final polymer was in the form of a stable, fine particle-sized latex. The latex was coagulated by freezing and the polymer washed repeatedly with water and air dried at 50° C.

The polymer of Example 1 was found to contain 7.3% combined styrene (as determined by chlorine analysis) and a specific viscosity as determined by the solution viscosity method of 0.53 (indicating a molecular weight as high as commercial polyvinyl chloride). When milled with di-2-ethylhexyl phthalate plasticizer the copolymer was found to form smooth transparent sheets on the mill roll at a roll temperature of only 210 to 230° F. Polyvinyl chloride, in contrast, requires a roll temperature of 250 to 280° F. to plasticize. The copolymer, when milled and plasticized gave no indication of containing polystyrene for when a thin film or sheet of the plasticized composition was rapidly flexed or pulled between the fingers, no whitening or internal crazing was observed at the zone of greatest stress. When, however, as little as 1% of powdered polystyrene is milled into polyvinyl chloride along with plasticizer, the final sheet shows whitening in the zone of greatest flexure (the latter phenomenon is usually interpreted as a sign that two polymeric materials are incompatible and do not form a truly homogeneous mixture).

The polymer of Example 1 was found to be completely soluble in acetone and ethyl acetate forming a clear low viscosity solution. Neither of these solvents were found to have an appreciable solubilizing action on either polyvinyl chloride or polystyrene.

The copolymer of Example 1 was milled with 40 and 52 parts per 100 parts of resin of di-2-ethylhexyl phthalate, respectively. The plasticized copolymer in each case was cut from the mill in strips and molded for 3 minutes at 300° F. in a standard tensile strip mold. The copolymer plasticized with 40 parts of plasticizer was found to have 3700 lbs. per sq. in. tensile strength, an elongation of 245%, and a modulus at 100% elongation of 2235 lbs. per sq. in. In contrast, polyvinyl chloride made by a similar method had an ultimate tensile strength of 3025 lbs. per sq. in., an elongation of 140%, and a modulus at 100% elongation of 2635 lbs. per sq. in. With 52 parts of plasticizer and 1 part of lead stearate stabilizer (per 100 of resin), the copolymer of Example 1 had a tensile strength of 2720 lbs. per sq. in., an elongation of 255% and a modulus at 100% elongation of 1230 lbs. per sq. in. The polyvinyl chloride control had a tensile strength of 1930 lbs. per sq. in., an elongation of 200%, and a 100% modulus of 1250 lbs. per sq. in. The brittleness temperature of the copolymer of Example 1 was −20 to −30° C. while that of good polyvinyl chloride is −35 to −45° C. It is seen that the copolymer of Example 1 has physical properties which compare very favorably with polyvinyl chloride yet process at lower temperatures than does polyvinyl chloride.

Example 2

A copolymer containing about 13.6% combined styrene was made using a similar procedure to that of Example 1 except that the original monomeric mixture consisted of 390 grams of vinyl chloride and 10 grams of styrene, the styrene pumping rate was 5.0 grams/hr. until a total of 33 grams had been added and the catalyst consisted of 1.5 grams each of potassium persulfate and sodium sulfide. The reaction yielded 12.0% in 1.75 hrs., 29% in 2.7 hrs., 63% in 4.1 hrs., and 79% in 8 hrs. of copolymer in the form of a stable latex.

Coagulation and drying of the copolymer was done in the same manner as in Example 1. The copolymer was found to have a specific viscosity of 0.51. The copolymer was found to be completely plasticized when milled for 20 minutes at 230° F. with 40 parts of di-2-ethylhexyl phthalate plasticizer. Its tensile strength was 2550 lbs./sq. in., its elongation 205%, and modulus at 100% 1645 lbs./sq. in. When plasticized with 52 parts per 100 of resin of plasticizer and having 1 part of lead stearate added, the copolymer was found to have a tensile strength of 1765 lbs./sq. in., an elongation of 230%, modulus of 765 lbs./sq. in., and a brittleness temperature of −20° C.

The copolymer of Example 2 was found to be completely soluble in acetone and ethyl acetate and considerably more soluble in benzene than that of Example 1. The copolymer of Example 2 like that of Example 1 was soluble in chlorobenzene, dioxane, and methyl ethyl ketone.

Example 3

A copolymer containing 22.2% combined styrene was prepared with a procedure similar to that of Example 1 except that the initial monomeric mixture contained 385 grams vinyl chloride and 15 grams of styrene, the styrene pumping rate was 4.0 grams/hour until a total of 49 grams had been added, and the catalyst consisted of 1.5 grams each of potassium persulfate and sodium sulfide. The reaction yielded 10% of theory of copolymer in 1.75 hrs., 32% in 4 hours, 41% in 6.75 hrs., 46% in 8.3 hrs., and 72% in 12 hours. The copolymer was again obtained in the form of a stable latex.

The copolymer was found to have a specific viscosity of 0.45. The copolymer could be easily milled in 20 minutes at 230° F. with plasticizer to form a clear homogeneous composition. With 40 parts of di-2-ethylhexyl phthalate plasticizer the tensile strength was 2020 lbs./sq. in., its elongation 155%, and modulus 1500 lbs./sq. in. The copolymer was found to be completely soluble in acetone and ethyl acetate and to be much more soluble than either of the above copolymers in benzene.

Example 4

A copolymer containing 36% combined styrene and having a specific viscosity of 0.33 was made utilizing the procedure of the preceding examples. The initial monomeric mixture contained 380 grams of vinyl chloride and 20 grams of styrene. Styrene was added at a rate of 2.5 cc./hr. until 25 grams were added. The reaction was terminated at approximately 40% yield and the unpolymerized monomeric material recovered for re-use. The copolymer was mixed with 40 parts of di-2-ethylhexyl phthalate plasticizer and found to have a tensile strength of 1880 lbs./sq. in., an elongation of 210% and a modulus at 100% elongation of 835 lbs./sq. in. The copolymer was found to be completely soluble in acetone, ethyl acetate, benzene, chlorobenzene and dioxane.

The copolymers of Examples 2 to 4 were found to be unique in that they can be milled or molded without plasticizer to form clear translucent compositions. For example, a sample of the copolymer of Example 4, of a given weight was placed between two polished metal plates and the assembly placed in a molding press, the platens of which were heated to 250° F. After the plates and the sample had reached an equilibrium temperature, a pressure of 1,000 lbs./sq. in. was applied for 1 minute. Cooling water was then admitted to the platens to chill the sample and the pressure was then released. The area occupied by the sample was measured and the results compared with those obtained in similar tests of the vinyl chloride vinyl acetate polymers used for making non-breakable phonograph records. The vinyl chloride styrene copolymers not only flowed to assume an area comparable to those of the vinyl chloride vinyl acetate copolymers but showed an excellent state of fusion (as indicated by the smooth edges of the melted sheet). The melted sheet of unplasticized vinyl chloride styrene copolymer was hard and rigid yet could be bent double without breaking.

The copolymers of Examples 1 to 4 not only had good physical properties but also possessed excellent chemical stability against the effects of ultraviolet light, heat and corrosive acids and bases. For example, when the plasticized copolymers of Examples 1 to 4 are exposed in the form of clear sheets ⅛ inch thick on a rotating table beneath a powerful ultraviolet light source along with similar sheets of plasticized standard polyvinyl chloride and copolymers of vinyl chloride with vinyl acetate, it was found that over a period of 23 hours of exposure, the vinyl chloride styrene copolymers appeared to be as resistant as the polyvinyl chloride (as evidenced by discoloration and flexibility) while the vinyl chloride vinyl acetate copolymers appeared to be almost black and quite stiff. When the exposure was continued for a total of 37.5 hours, the vinyl chloride styrene copolymers proved to be superior to both polyvinyl chloride and the vinyl chloride vinyl acetate copolymers.

When samples similar to those above, were heated in still air for 67½ hours at 110° C., the vinyl chloride styrene copolymers were a shade darker than the polyvinyl chloride, though the former were still much clearer than the latter, and the vinyl chloride vinyl acetate copolymers had become a chocolate tan color and were entirely opaque. When the heating was continued for one week (168½ hrs.) the vinyl chloride styrene copolymers were still a shade darker than the polyvinyl chloride but were still quite translucent while the polyvinyl chloride was definitely opaque. In the same time interval the vinyl chloride vinyl acetate copolymers seemed to have progressively deteriorated and become useless. Thus, the vinyl chloride styrene copolymers seem to be superior to polyvinyl chloride and vinyl chloride vinyl acetate copolymers upon prolonged exposure. It is also seen that the above stability to light and heat adapt the copolymers of this invention to many uses for which polyvinyl chloride on account of its insolubility can not be used and for which vinyl chloride vinyl acetate copolymers because of their instability can not be used.

In a similar manner by maintaining the styrene proportion in the monomeric mixture between 1 and 10% of the total monomer in the reaction vessel throughout the reaction cycle, it is possible to produce copolymers containing 40, 50, 60 and even 70% combined styrene. For example, a styrene concentration of about 5% will produce a copolymer containing approximately 50% combined styrene content, a styrene concentration of 7.5% will produce a copolymer of 60% combined styrene content, and a styrene content in the monomeric mixture of about 10% will produce a copolymer of 65 to 70% combined styrene content.

The copolymers of this invention may be combined with plasticizers, pigments, carbon blacks, fillers, age resistors, coloring materials, solvents, and the like in the same manner and in the same degree as other vinyl chloride polymers to produce a great variety of compositions useful in many ways as is well understood by the art.

While the invention has been disclosed with particular reference to certain preferred embodiments thereof it is possible to make variations and modifications therein without departing from the spirit and scope of the invention as defined in the appended claims.

I claim:

1. The method of producing a copolymer of vinyl chloride and styrene characterized by freedom from contamination by polyvinyl chloride and polystyrene, by complete solubility in acetone and in ethyl acetate and by the ability to be processed at temperatures lower than those required to process polyvinyl chloride and polystyrene, which method comprises preparing an aqueous emulsion comprising water, a water-soluble persulfate, a water-soluble normal alkali sulfite, a dispersing agent and monomeric material consisting of monomeric vinyl chloride and monomeric styrene, said water being present in sufficient amount to maintain the aqueous phase to monomer ratio in the range of 1:1 to 6:1, said persulfate and sulfite being present in approximately equal amounts ranging from 0.175 to 1% each by weight based on the total monomeric material, said dispersing agent being present in amounts ranging from 0.25 to 1.25% based on the total monomers, and said monomeric styrene being present in an amount selected from the range of from 1 to 10% by weight based on the total monomeric material, starting copolymerization of the monomeric vinyl chloride and styrene in said emulsion at a temperature in the range of 20 to 70° C. and at autogenous pressure, adding monomeric styrene to said emulsion as copolymerization proceeds at a rate adapted to maintain its concentration in the emulsion at the said selected amount in the range of 1 to 10% based on the total monomeric material, while continuing copolymerization and addition of monomeric styrene at the said temperature and pressure for a time sufficient to convert at least 40% of the total monomeric material to copolymer, and finally recovering the vinyl chloride styrene copolymer formed.

2. The method of claim 1 wherein the selected amount of monomeric styrene initially present in the emulsion and maintained in the emulsion during copolymerization, is in the range of 1 to 5% based on the total monomeric material, wherein the water-soluble persulfate is potassium persulfate, and wherein the water-soluble alkali sulfite is sodium sulfite.

HAROLD TUCKER.

REFERENCES CITED

The following references are of record in the file of this patent:

UNITED STATES PATENTS

| Number | Name | Date |
|---|---|---|
| 2,012,177 | Voss et al. | Aug. 20, 1935 |
| 2,100,900 | Fikentscher et al. | Nov. 30, 1937 |
| 2,151,507 | Fikentscher et al. | Mar. 21, 1939 |
| 2,462,422 | Plambeck | Feb. 22, 1949 |
| 2,532,727 | Larchar | Dec. 5, 1950 |

OTHER REFERENCES

Meyer et al.: Natural and Synthetic High Polymers, Interscience 1942, pp. 21 to 23.

Office of Technical Services, PB40871-T, page 1.

Chapin et al.: Journal American Chemical Society, vol. 70, Feb. 1948, pages 538 to 542.